Figure 1:
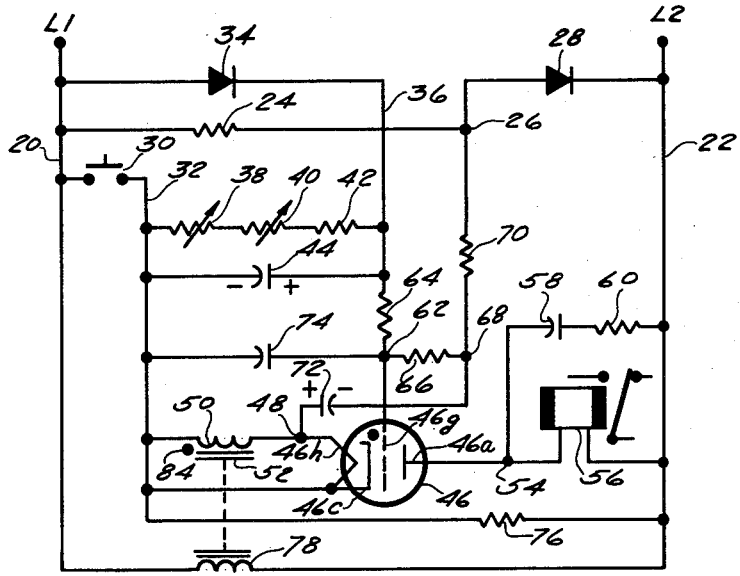

Dec. 29, 1964  C. W. PORTER ETAL  3,163,825
REVERSIBLE TIMING CIRCUIT
Filed Dec. 15, 1960

INVENTORS
CLARENCE W. PORTER
MARVIN A. GUETTEL
BY
*William H. Schmeling*

3,163,825
REVERSIBLE TIMING CIRCUIT
Clarence W. Porter and Marvin A. Guettel, Milwaukee, Wis., assignors to Square D Company, Park Ridge, Ill., a corporation of Michigan
Filed Dec. 15, 1960, Ser. No. 75,973
4 Claims. (Cl. 328—86)

This invention relates to timing circuits and is more particularly concerned with a single circuit for use with a gas filled electronic tube which will provide a constant timing period regardless of the conductive state of the tube at the end of the period.

The timing circuit according to the present invention is characterized by its simplicity and its ability to control the operation for a gas filled electronic tube, such as a thyratron, so the tube has two different modes or operation in a circuit. The different modes of operation are the ability of the timing circuit to cause the tube to be either conductive or nonconductive at the end of the timing period and wherein the change of operation is accomplished without any appreciable variations in the duration of the timing period. Thus the timing circuit according to the present invention is particularly suited to control the individual timing intervals in a resistance welder control wherein the conventional squeeze, weld and hold time intervals are controlled with three individual timing circuits all of which are substantially identical. Thus the individual timing circuits may be constructed as circuit modules and permit manufacturers to reduce their inventory and provide an interchangeabilty of components not heretofore possible in resistance welder circuits.

The timing circuit according to the present invention utilizes a pair of capacitors which are charged to different voltage potentials of opposite polarity. One of the capacitors is provided with an adjustable discharge path so that the timing period may be varied. These two capacitors are each respectively connected to the grid circuit of the tube to be controlled so that at the end of the timing period the conduction of the tube is either initiated or terminated.

It is to be appreciated that the critical grid voltage of a typical thyratron tube which controls the point on the anode voltage wave at which the thyratron will fire or become conductive occurs over a set of voltage values which are slightly negative in potential. Therefore, if the timing is to be constant in initiating or terminating the conduction of the tube at the end of a timing period, the operation of the hold off bias on the grid must be modified for the two different modes of operation. This modification of the grid bias in the present invention is accomplished without additional cost through the use of the voltage across the transformer which normally furnishes energy to the cathode heater of the thyratron.

An object of the present invention is to provide a timing circuit for controlling the conductive state of a gas filled electronic tube which will provide a substantially constant timing period regardless of the conductive state of the tube at the end of the timing period.

Another object of the present invention is to provide a reversible timing circuit for controlling the conduction of a gas filled electronic tube which circuit will change the conductive state of the tube so the tube is either conductive or nonconductive at the end of the timing period without substantially varying the time interval between the initiating of the timing period and the change of state of the tube.

A further object of the present invention is to provide a novel reversible timing circuit for controlling the conductive state of a gas filled electronic tube wherein the voltage output of a transformer in the heater circuit of the tube provides a voltage signal for compensating for the variations in bias requirements of the tube when the operation of the timer is changed so the conductive state of the tube at the end of the timing period is reversed.

In carrying out the above object it is another object of the present invention to utilize a single pair of normally open initiating switch contacts to complete the anode to cathode circuit of a gas filled electronic tube and to shunt a pair of separate charging circuits for a pair of separate biasing capacitors for the tube.

Further objects and features of the invention will be readily apparent to those skilled in the art from the specification and appended drawing illustrating certain preferred embodiments in which:

FIG. 1 schematically shows one form of the timing circuit according to the present invention.

Figure 2:
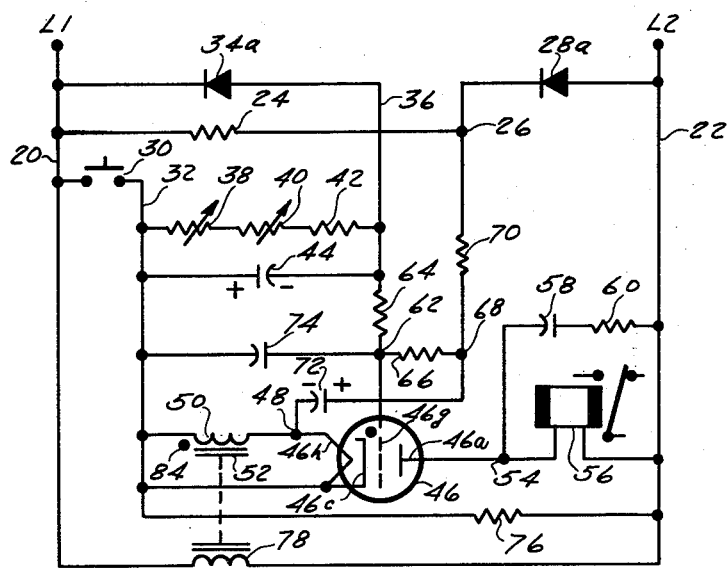

FIG. 2 schematically shows another form of the timing circuit as shown in FIG. 1.

Figure 3:
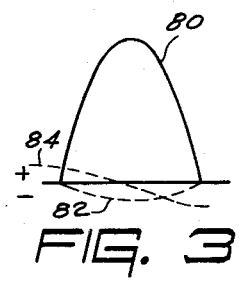

FIG. 3 diagrammatically shows the relationship of the critical grid voltage and anode voltage curves of a typical gas filled grid controlled electronic tube.

In the drawings, and in FIG. 1 particularly, a pair of terminals L1 and L2 are connected to a suitable alternating current source, not shown. The terminal L1 is connected to supply a bus 20 and the terminal L2 is connected to supply a bus 22. Connected in series between bus leads 20 and 22 is resistance 24, a junction 26, and a diode 28. An initiating switch 30, having normally open switch contacts, is connected between the bus 20 and a lead 32. A rectifier 34 is connected between the bus 20 and a lead 36. Connected in series between leads 32 and 36 is an adjustable resistor 38, an adjustable resistor 40 and a resistor 42. The series circuit which includes the adjustable resistors 38 and 40 and resistor 42 provides an adjustable R.C. discharge circuit for a capacitor 44 connected between the leads 32 and 36. A gas filled electronic tube, such as a thyratron 46, has an anode 46a, a cathode 46c and a control grid 46g. The thyratron 46 is also provided with a cathode heater shown as 46h, connected to the cathode 46c in a conventional fashion. The cathode 46c is directly connected to the lead 32. The and a secondary winding 50 of a transformer 52 to lead 32. The anode 46a is connected through a junction 54 and an energizing coil of a relay 56 to the lead 22. A capacitor 58 and a resistor 60, connected in series, are connected in a parallel circuit with the relay coil 56 between the junction 54 and the lead 22. The grid 46g is connected through a junction 62 and a current limiting resistor 64 to lead 36. A second current limiting resistor 66 is connected between the junction 62 and a junction 68 which is in turn connected through a resistor 70 to the junction 26. A capacitor 72 is connected between junctions 48 and 68 and a capacitor 74 is connected between the lead 32 and the junction 62. Also connected between the leads 32 and 22 is a resistor 76. A primary winding 78 of the transformer 52 is connected between the leads 20 and 22 so as to be continuously energized from the terminals L1 and L2. For the sake of illustration, the primary winding 78 is coupled to the secondary winding 50 by a dotted line.

With the above parts in mind, the operation of the circuit will be described. During the standby conditions, that is, when the initiating switch 30 has its contacts in the open circuit position as shown in FIG. 1, the capacitor 44 will be charged to have the polarity indicated. During the half cycle periods which the alternating current source causes the terminal L1 to have a positive polarity, both diodes 34 and 28 will conduct and current will flow from the terminal L1 to the terminal L2 through a circuit which includes diode 34, lead 36, capacitor 44, lead 32, the resistor 76 and lead 22. During the half cycle when the supply causes the terminal L2 to have a positive polarity, the capacitor 72 will be charged through a circuit which includes the terminal L2, lead 22, resistor 76, lead 32, the secondary winding 50, the junction 48, capacitor 72, junction 68, resistor 70, junction 26 and lead 20. The polarity of the charge on the capacitor 72 during this period will be that as shown in FIG. 1. During the half cycles, when the terminal L2 is positive, the diodes 28 and 34 block current flow. The potentials impressed across capacitors 44 and 72 will not appreciably change during the half cycles when terminals L1 and L2 are respectively negative because of the high impedance of the respective discharge paths for capacitors 44 and 72.

Thus, during the standby conditions, the capacitors will become substantially fully charged. The positive side of capacitor 44 is connected through the current limiting resistor 64 to the grid 46g. The negative side of capacitor 44 is connected directly to the cathode 46c. Thus in FIG. 1 the tube 46 is biased toward conduction by capacitor 44. The capacitor 72 has its positive terminal connected to the cathode 46c through a circuit which includes the junction 48 and the secondary winding 50. The negative terminal on capacitor 72 is connected through the junction 68 and the current limiting resistor 66 to the grid 46g. Thus in FIG. 1 the capacitor 72 biases the tube 46 toward nonconduction. If the electrical parameters of the following components are selected to have the typical values indicated, the charge on capacitor 44 will be appreciably greater than the charge on the capacitor 72 and the tube 46 will be biased toward its conductive state during standby conditions, that is, during the interval when the initiating switch is open.

| | | |
|---|---|---|
| Capacitor 44 | mfd | 1.0 |
| Capacitor 72 | do | 0.1 |
| Resistor 24 | ohms | 22K |
| Resistor 76 | do | 12K |
| Resistor 70 | do | 470K |
| Capacitor 74 | mfd | .001 |
| Resistor 66 | megohms | 7.5 |
| Resistor 64 | do | 4.7 |

Closure of the contacts of the switch 30 initiates the timing period. When the contacts of switch 30 are closed a circuit from the cathode 46c to the lead 20 is completed. The closure of the initiating switch 30 will also cause the lead 32 to have the same potential as the lead 20 to effectively shunt the aforementioned charging circuits for capacitors 44 and 72. When the lead 32 is at the same potential as lead 20, the charging path through diode 34 and capacitor 44 is shunted and the charging of the capacitor 44 will cease. During the period when the terminal L2 is positive, the charging circuit from terminal L2 to capacitor 72 will be shunted as lead 32 is now tied to lead 20 directly instead of through the charging path which included resistors 76, 70 and 24. However, when the initiating switch 30 is closed and the terminal L1 is positive, a circuit for sustaining the charge on the capacitor 72 is established. This circuit extends from terminal L1 through lead 20, switch 30, lead 32, secondary winding 50, capacitor 72, resistor 70, junction 26 and diode 28 to terminal L2.

When the initiating switch 30 is closed a circuit from terminal L2 to terminal L1 through the relay coil 56 and the anode to cathode tube 46 is completed. This circuit includes the lead 32, the initiating switch 30 and lead 20. When the diodes 34 and 28 are connected as shown in FIG. 1, the tube 46 is biased toward conduction by capacitor 44. Therefore during the half cycle when L2 has a positive polarity the tube 46 will conduct current and the coil of the relay 56 will be energized to close the relay contacts 56c which control a separate circuit, not shown. During the succeeding half cycle, wherein the tube is rendered nonconductive, because its anode voltage has a negative polarity impressed thereon by the negative polarity at terminal L2, the capacitor 58 and the resistance 60 will provide a sustaining circuit for the coil of relay 56 in the manner well known to those skilled in the art.

The circuit shown in FIG. 2 is identical to that shown in FIG. 1, except the polarity of the diodes 34 and 28 as shown in FIG. 1 are reversed and are therefore respectively designated in FIG. 2 as diodes 34a and 28a. This reversal of the polarity of the diodes 34a and 28a will cause the potential on the capacitors 44 and 72 to be similarly reversed so that the capacitors which changed will have the polarity shown. The charging of the capacitor 44 will occur during the interval when the terminal L2 has a positive polarity. This charging circuit will extend from the terminal L2 through lead 22 and resistor 76 to the capacitor 44 from whence it extends through the lead 36 and the diode 34a to the terminal L1. During the interval when the terminal L1 has a positive polarity, the capacitor 72 will be charged to have the polarity indicated through the circuit which extends from terminal L1 through resistor 24, junction 26, resistor 70, junction 68, capacitor 72, junction 48 and resistor 76 to lead 22. As in the circuit shown in FIG. 1, the magnitude of the charge on capacitor 44 will be opposite to and appreciably greater than the charge on capacitor 72. Capacitor 44 has its negative terminal connected to the grid 46g and its positive terminal connected to the cathode 46c. Thus during standby conditions, tube 46 will be biased to the nonconductive state by capacitor 44. When the initiating switch 30 is closed, the circuit to the cathode 46c is completed and the original charging circuits of the capacitors 44 and 72 are respectively shunted and a circuit for sustaining the charge on capacitor 72 is established.

When the initating switch is closed in either of the above embodiments, the capacitor 44 will discharge at a timed rate through resistors 38, 40 and 42 while the charge on capacitor 72 remains substantially constant. After an interval of time, determined by the setting of the adjustable resistors 38 and 40, the charge on capacitor 44 will become less than the charge on capacitor 72 and the capacitor 72 will then control the conduction of tube 46. In FIG. 1, the conduction of the tube will be interrupted as the negative terminal of the capacitor 72 is tied to the grid 46g. In FIG. 2, the tube will be rendered conductive because a positive terminal of capacitor 72 is connected to the grid 46g through the current limiting resistors 66. The resistors 64 and 66 have a common connection at junction 62 which is connected to the grid 46g. The resistors 64 and 66 have their respective ends connected to the terminals of capacitors 44 and 72 which are of opposite polarity. The resistors 64 and 66 therefore act as voltage dividers for the differences of the potentials on capacitors 44 and 72. Thus the circuit in FIG. 1 may be used in the conventional resistance welder control to determine the time interval of the weld period wherein the tube 46 is rendered conductive at the beginning of the timing interval to actuate the relay 56 only during the interval when welding current is required to flow. The circuit shown in FIG. 2 is particularly suited to govern the squeeze and hold periods. When the circuit shown in FIG. 2 is used, the tube 46 is biased toward a nonconductive state during standby conditions and is biased toward conduction for an adjustable interval after the initiating switch is closed. This arrangement will provide a safe circuit arrangement for each of the timing cycles. If the tube 46 fails to fire in either the squeeze or hold sequences, then these periods would never end. If the tube 46 fails in the weld sequence, no welding current would flow.

In FIG. 3, the typical voltage characteristics of a thyratron are shown, wherein curve 80 represents the voltage impressed between the anode and cathode of the thyratron during the half cycle when the alternating supply causes the anode to become positive. The curve 82 represents the critical negative voltage required between the grid and cathode to bias the thyratron against conduction. It will be seen from FIG. 3 that the tube 46 will conduct even though the grid to cathode voltage is negative. Thus the tube may conduct when the grid bias voltage is slightly negative or at a value other than zero volts. This fact will cause the circuit shown in FIG. 1 and FIG. 2 to have unequal timing periods unless an additional compensating means, which will be hereinafter described, is incorporated into the circuit. This compensating means is provided by the secondary winding 50, the capacitor 74, the resistor 66. The transformer winding 52 supplies the cathode heater winding 46h with energy. The transformer secondary winding 50 is connected in the circuit so that during the interval when the voltage on anode 46a has a positive polarity, the end of the transformer winding 50, indicated by the dot 84, will have a positive polarity. The voltage output of the transformer winding 50 is slightly phase shifted by the capacitor 74 and the resistor 66 and will appear across capacitor 74 as a lagging alternating current voltage wave as shown by curve 84 in FIG. 3. The direction of the bias between the grid and cathode of tube 46 as provided by the voltage shown on curve 84 will be in the direction to bias the tube 46 against conduction during the late portions of the half cycle intervals of the anode voltage wave 80 and will tend to cause the tube to be conductive during the early portions of the half cycle. Thus the output of transformer winding 50 will synchronize the conduction of the tube 46 and will aid the capacitors 44 and 72 in biasing the tube against conduction to overcome unequal bias requirements on the grid is dictated by the characteristics of the critical grid voltage curve.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A timing circuit for use with a gas filled tube having an anode, a cathode and a control grid wherein the timing circuit provides a substantially constant interval timing regardless of the conductive state of the tube and wherein the gas filled tube is rendered respectively conductive and non-conductive when a bias voltage between the grid and cathode is respectively greater and less than a value other than zero volts, comprising; an alternating current source, a first circuit arranged for connecting the anode and the cathode across the source, a first and a second capacitor connected in individual bias circuits between the grid and cathode, an impedance means, individual charging circuits connecting the capacitors to the source through the impedance means, means in circuit with each of the charging circuits arranged so the charge on the first capacitor is greater than and opposes the bias on the grid by the second capacitor, an adjustable discharge circuit for the first capacitor for varying the time interval of the timing circuit, an initiating switch having closeable contacts in the first circuit for completing said first circuit with said contacts being in circuit with the impedance means for shunting the charging circuits through said impedance means when the contacts of the initiating switch are closed and means including a transformer having a secondary winding connected in the bias circuit of the second capacitor and a primary winding in circuit with the source for supplying an alternating current voltage between the grid and cathode which is shifted in phase from the voltage impressed across the anode and cathode by the first circuit.

2. The combination as recited in claim 1 wherein the transformer is connected in a circuit with a cathode heater for the tube.

3. The combination as recited in claim 1 wherein the means in each of the charging circuits consists of a diode each of which determines the polarity of the charge of the capacitor connected in circuit therewith and which diode when reversed in each of the charging circuits will reverse the operation of the tube without changing the timing interval of the timing circuit.

4. A timing circuit comprising; an alternating current source, a gas filled tube having an anode and cathode and a grid for controlling the conduction of the device, a pair of capacitors connected in separate bias circuits between the grid and cathode, each of said capacitors being chargeable for biasing the tube into conductive and nonconductive states, an impedance means, a pair of charging circuits each having a diode connected so the capacitors are charged through the impedance means by the source, said charging circuits and diodes being arranged for controlling the charging direction of the respective capacitors so the bias provided by one of the capacitors is greater than and opposes the bias provided by the other capacitor, and adjustable discharge circuit for the said one capacitor for varying the time interval of the timing circuit, an initiating switch having normally open switch contacts in a circuit connecting the cathode to the source and connected to the impedance means for shunting the charging circuits whereby the initiating switch contacts when closed will complete the circuit between the cathode and source and simultaneously interrupt the charging of the capacitors through said impedance means, circuit means connecting the initiating switch in circuit with the said other capacitor and the diode controlling the charging direction of the said other capacitor for maintaining the bias on the said other capacitor while said one capacitor discharges through its discharge path, and a transformer having a primary winding connected in a circuit across the source and a secondary winding in a circuit for energizing a heater electrode of the tube and arranged for supplying an alternating voltage between the grid and cathode which is out of phase with the voltage impressed by the source on the cathode and anode of the tube for compensating the timing circuit for variations in the bias requirements of the tube when the charges on the capacitors are reversed to change the conductive state of the tube at the end of the timing period.

References Cited in the file of this patent

UNITED STATES PATENTS

| | | |
|---|---|---|
| 2,454,168 | Hartwig | Nov. 16, 1948 |
| 2,790,115 | Elliot | Apr. 23, 1957 |
| 2,874,335 | Rockafellow | Feb. 17, 1959 |
| 2,941,127 | Elliot | June 14, 1960 |